Figure 4:
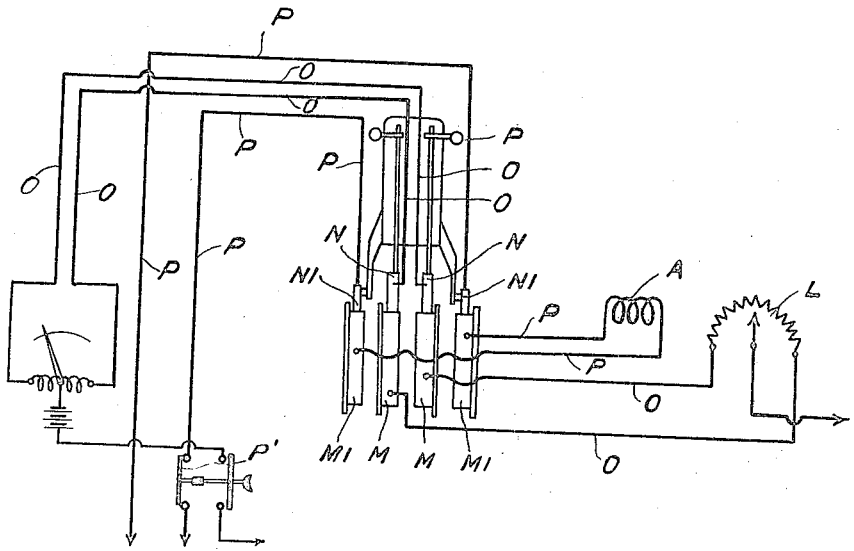

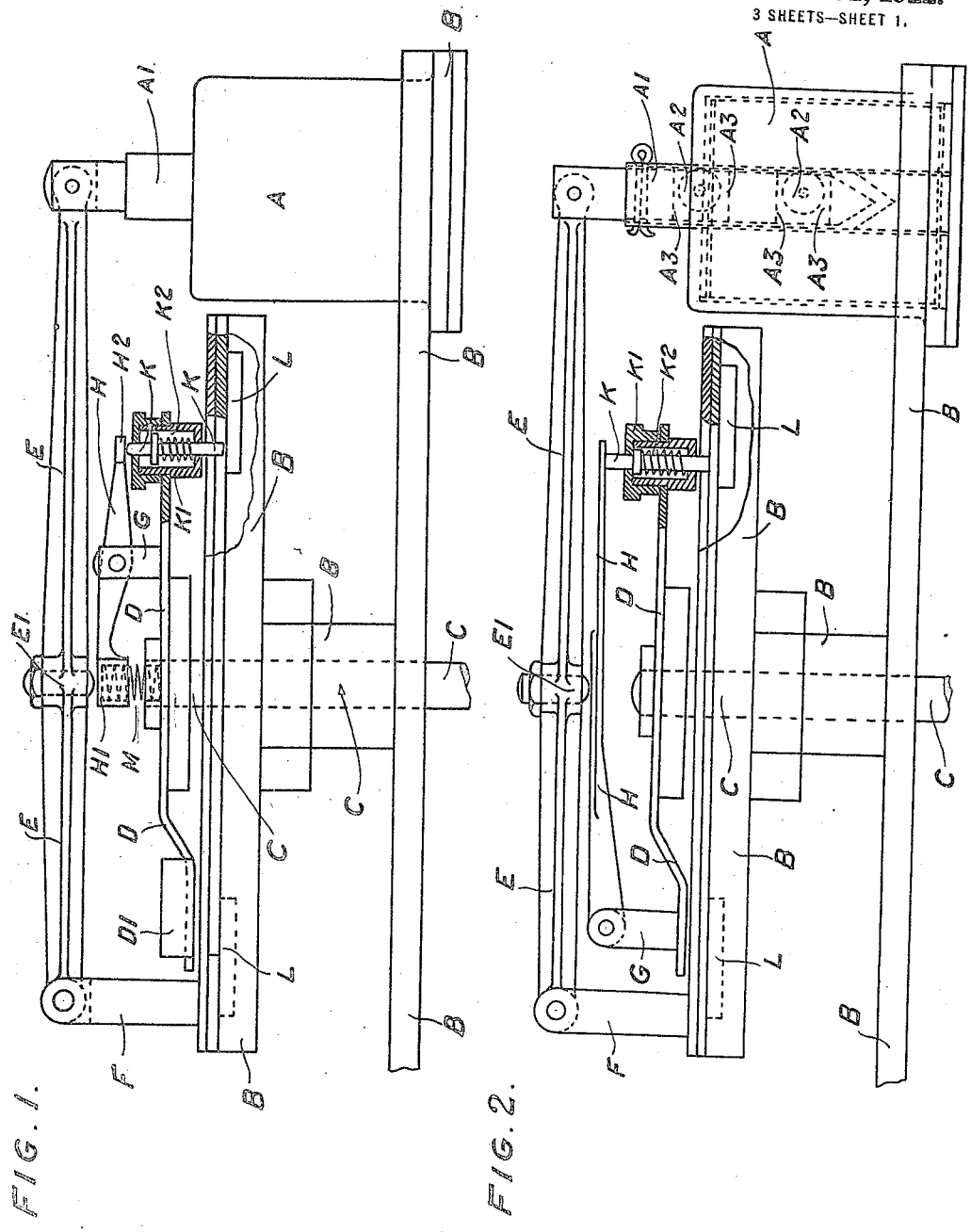

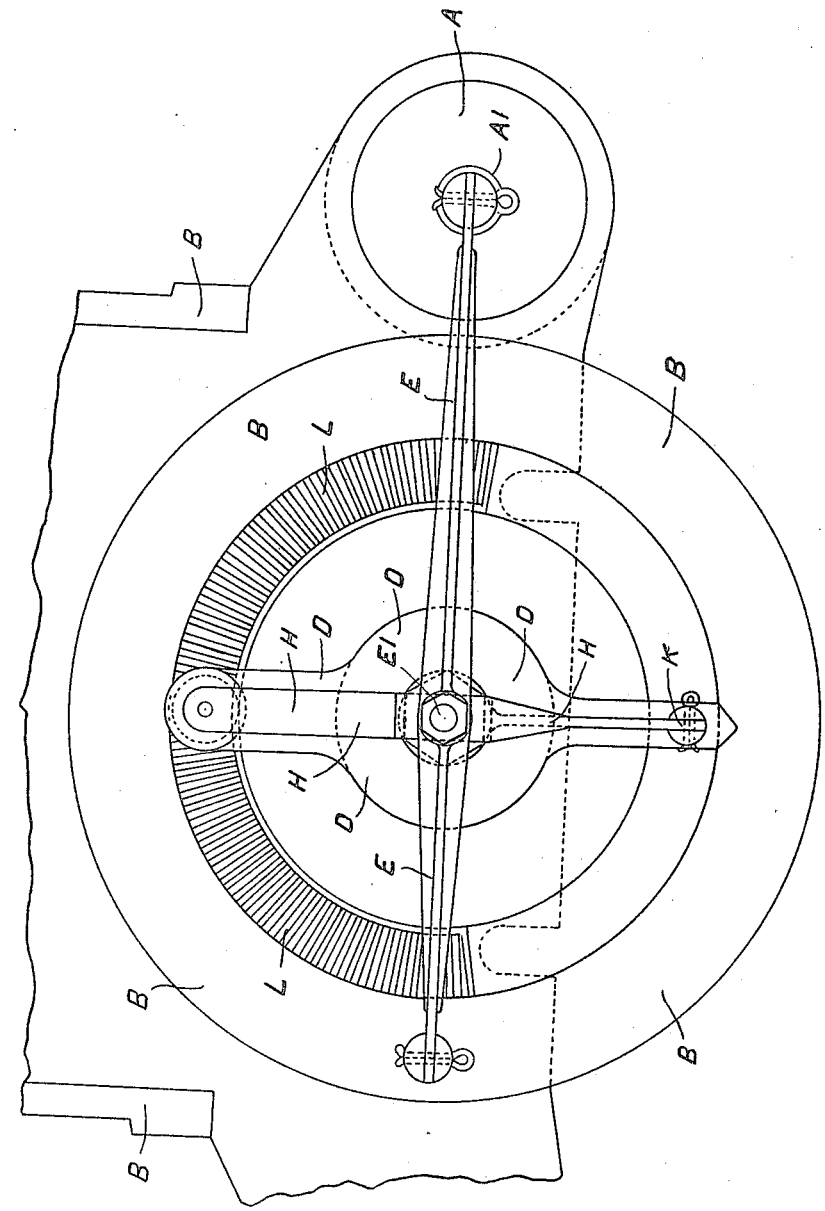

F. T. EDGECOMBE.
TORSIONMETER.
APPLICATION FILED JULY 16, 1920.

1,434,107.

Patented Oct. 31, 1922.
3 SHEETS—SHEET 3.

INVENTOR
FREDERICK T. EDGECOMBE
BY
ATTORNEYS

Patented Oct. 31, 1922.

1,434,107

UNITED STATES PATENT OFFICE.

FREDERICK THOMAS EDGECOMBE, OF DUMBARTON, SCOTLAND.

TORSIONMETER.

Application filed July 16, 1920. Serial No. 396,658.

*To all whom it may concern:*

Be it known that I, FREDERICK THOMAS EDGECOMBE, a subject of the King of Great Britain and Ireland, and a resident of Dumbarton, in the county of Dumbarton, Scotland, naval architect, have invented certain new and useful Improvements in Torsionmeters, of which the following is the specification.

This invention relates to the torsionmeter described in the specification of my prior Patent No. 1,065,305, which comprises a mechanical torque measuring and measurement multiplying device in combination with an electrical indicating device consisting of a rheostat, in circuit with a measuring instrument in the known manner of an electrical resistance varying torsionmeter, and having a moving balanced arm driven through gearing from one of those parts in the mechanical device to which is transmitted a multiplication of the torque movement.

The balanced arm carries a contactor (or contactors) making contact with an arc (or arcs) of resistance and the contactor is continually rubbing on the rheostat. There is consequently considerable wear of both contactor and rheostat.

The present invention has for its object so to improve the construction of the torsionmeter as to obviate this disability, by providing means whereby the contactor is held clear of the rheostat, except at such times as it is desired to bring the instrument into use to measure the torsion of a shaft.

According to the invention there is attached to the transmitter a solenoid operating a lever which controls the position of the contactor. The solenoid circuit is separate from the torsionmeter circuit, and has two independent slip rings and brushes.

In the measuring instrument there is a switch arranged, so that when the key is pressed to obtain a reading of the torsion, the solenoid circuit is also brought automatically into action.

The solenoid circuit is supplied from any convenient source of power separate from that for the torsionmeter circuit, such, for example, as the ordinary ship's lighting circuit.

The device may be arranged to operate in one or other of two ways, namely (1) so that the solenoid is energized in order to keep the contactor clear of the rheostat, in which case the solenoid circuit is always in operation except when readings are being taken, and the contactor is at one end of a separate arm pivoted at its middle on the balanced arm and acted upon at its opposite end by the solenoid lever; or (2) so that the solenoid is energized in order to bring the contactor into contact with the rheostat, in which case the solenoid circuit is only used when torsion readings are being taken, and in this case the separate arm carrying the contactor is acted upon at its centre by the solenoid lever and hinged at its end on the balanced arm.

Figure 5:
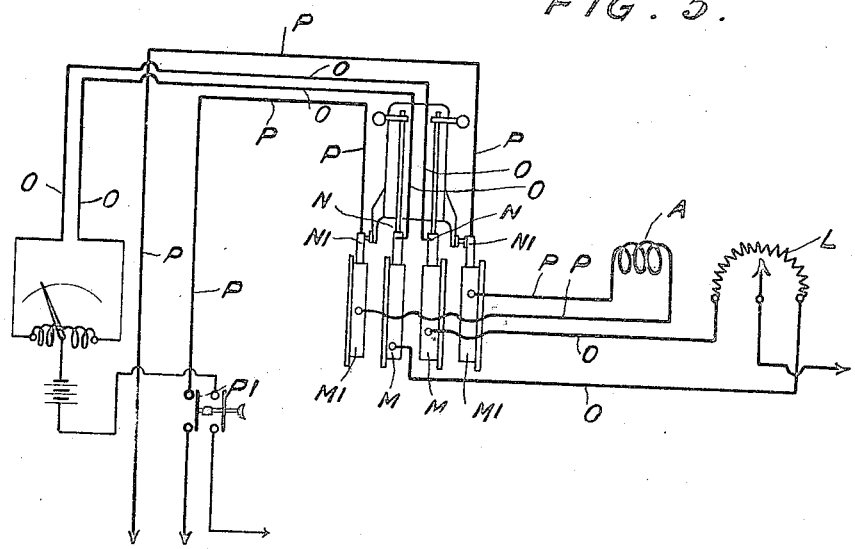

Two illustrative examples of the method of carrying out the invention are shown diagrammatically on three accompanying sheets of explanatory drawings, Figure 1 of these drawings shows the arrangement of parts when the solenoid is energized and the contactor clear of the rheostat, except when torsion readings are being taken. In Figure 2 the arrangement is such that the solenoid is energized only while readings are being taken. Figure 3 is a plan view corresponding to Figure 2 but with the contactor arm shown at right angles to the solenoid lever. Figures 4 and 5 are diagrams of the electrical connections corresponding respectively to the arrangements shown in Figures 1 and 2.

Referring to the first example (Figures 1 and 4) a solenoid A is attached to a member B the movement of which relative to a shaft C carrying a balanced arm D is transmitted from the shaft to be tested by the mechanical multiplying device hereinbefore referred to. The solenoid plunger $A^1$ is pivotally connected at its upper end to one end of a lever E, the other end of which is fulcrumed in a bracket F carried on the member B. Located beneath the solenoid lever E and pivoted in a bracket G attached to the balanced arm D, is a separate arm H, adapted at one end $H^1$ to be operated by an adjustable screw $E^1$ in the lever E, and at the other end $H^2$ to engage a contactor pin K. A rheostat L of usual form is carried in the member B and is so positioned as to be engaged by the contactor K when required. The pin K is located in a housing $K^1$ formed in the end of the balanced arm D and when not operated on by the arm H, is maintained out of contact with the rheostat L by the action of a spring $K^2$. The weight carried by the arm D on the side of the contactor is counterbalanced by a balanced weight $D^1$ located in the opposite side of the arm. Disposed between the centre of the arm D and the end H¹ of the arm H is a spring M in compression, which, when the solenoid lever E is in the raised position, is sufficiently strong to overcome the thrust of the contactor spring K² and to maintain the end H^e of the arm H depressed and the contactor in contact with the rheostat.

In operation, when no torsion readings are being taken the solenoid is energized, the end H² of the arm H being raised by the action of the solenoid lever E on the other end of this arm, and the contactor being in turn maintained out of engagement with the rheostat by the spring K². When however the solenoid circuit is broken (that is, when readings are to be taken) the plunger A¹ rises, releasing the pressure of the screw E¹ on the end of the arm H and allowing the spring M to force down the other end of the arm and bring the contactor and rheostat into engagement.

Slip rings M, M and brushes N, N (Figure 4) are provided for the rheostat or indicator circuit O, and rings M¹, M¹ and brushes N¹, N¹ for the solenoid circuit P, which is independent of the former. The balanced arm D is earthed through the member B in usual manner. The solenoid circuit is controlled by a switch P¹ which is interlocked with the key of an ammeter or other measuring instrument in the indicator circuit. The switch P¹ is normally "on" but is automatically cut off when the measuring instrument is brought into the indicator circuit.

In the second example (Figures 2, 3 and 5) the bracket G is secured to the balanced arm D at the opposite end from the contactor K, the arm H in this case being hinged at one end to the bracket G secured at the other to the contactor pin K and adapted to be operated on at its centre by the screw E¹ of the solenoid lever. In this example the solenoid lever is normally inoperative, the contactor being maintained out of engagement with the rheostat by the action of the spring K². On the solenoid being energized, the screw E¹ bears down on the centre of the arm H and depresses the contactor against the action of its spring K² into engagement with the rheostat L. As in the first example the switch P¹ controlling the solenoid circuit is interlocked with the press key of the measuring instrument in the indicator circuit, but in this case the switch P¹ is normally "off", contact being automatically made and the solenoid energized, when the key of the measuring instrument is depressed to bring the latter into circuit.

In both the foregoing examples the solenoid A is attached to the transmitting member B which is normal to the axis of, and revolves with the shaft the torsion in which is being measured. Centrifugal force produces a considerable pressure between the solenoid plunger A¹ and its circular casing, and means have to be provided in order to prevent the frictional resistance caused by this pressure from overcoming the initial pull of the solenoid. To this end two small rollers A² fitted in slots A³ in the plunger A¹ (Figure 2) are located in the plane passing through the centre line of the solenoid and that of the shaft under test, and are arranged to bear on the plunger casing at the side thereof remote from the axis of the shaft.

What I claim is: —

1. In torsionmeters of the type referred to in which torque is measured by the relative movement between two members, a contactor, a balanced arm carrying the same, a rheostat over which the contactor is adapted to move during operation of the torsionmeter, electro-magnetically operated means for bringing the contactor into and out of electrical engagement with the rheostat, and manual switch means controlling said rheostat and electro-magnetically operated means as set forth.

2. In a torsionmeter of the construction specified in claim 1, a solenoid attached to the member carrying the rheostat and having a plunger; a lever hinged at one end to this member and pivotally connected at the other to the solenoid plunger; a balanced arm at one end provided at one end with a housing, and counterbalanced at the other, a contactor pin supported in said housing, and a separate arm or lever pivoted on the balanced arm and coacting with the solenoid lever and with the contactor, as set forth.

3. In a torsionmeter of the construction specified in claim 1, a solenoid attached to the member carrying the rheostat, and having a plunger, a lever hinged at one end to this member and pivotally connected with the other to the solenoid plunger, a balanced arm provided at one end with a housing, and counterbalanced at the other, a contactor pin supported in said housing, a separate arm or lever extending between the center of the balanced arm and the contactor and pivoted at or near its center to the balanced arm, and coacting at one end with the solenoid lever and at the other with the contactor, and spring devices between the center of the balanced arm and the adjacent end of the separate arm and between the contactor pin and its housing, substantially as set forth.

4. In a torsionmeter of the construction specified in claim 1, a solenoid attached to the member carrying the rheostat, and having a plunger, a lever hinged to this member and pivotally connected to the solenoid plunger, a balanced arm provided at one end with a housing, and counterbalanced at the other, a contactor pin supported in said housing, a separate lever pivoted to the balanced arm, and secured at its other end to the contactor and co-acting at a point adjacent to the center of the balanced arm with the solenoid lever, and a spring device between the contactor and its housing.

5. In a torsionmeter of the type described in which the torque is measured by the relative movement between two members, a contactor, a balanced arm carrying the same, a rheostat over which the contactor is adapted to move during the operation of the torsionmeter, and means for bringing the contactor into and out of electrical engagement with the rheostat, said means comprising a solenoid attached to the member carrying the rheostat and having a slotted plunger, and rollers mounted in the slots of the solenoid plunger, said rollers being located in the plane passing through the center line of the solenoid and that of the shaft under test, and bearing on the plunger on the solenoid casing at the side thereof remote from the axis of the shaft.

6. In torsionmeters of the type described, in which the torque is measured by the relative movement between two members, a contactor, a balanced arm carrying the same, a rheostat over which the contactor is adapted to move during the operation of the torsionmeter, and means for bringing the contactor into and out of electrical engagement with the rheostat, in combination with a torsionmeter circuit, an electrical measuring instrument in the circuit, a switch controlling the circuit, an independent solenoid circuit, a switch controlling the solenoid circuit and interlocking with the switch of the measuring instrument to automatically bring the contactor into engagement with the rheostat simultaneously with the closing of the measuring instrument circuit.

In testimony whereof I have signed my name to this specification.

FREDERICK THOMAS EDGECOMBE.